United States Patent
McCurdy

(10) Patent No.: US 7,278,657 B1
(45) Date of Patent: Oct. 9, 2007

(54) METHOD AND APPARATUS FOR CONTROLLING AN ACTUATABLE OCCUPANT PROTECTION DEVICE USING AN ULTRASONIC SENSOR

(75) Inventor: Roger A. McCurdy, Troy, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 09/494,954

(22) Filed: Feb. 1, 2000

(51) Int. Cl.
*B60K 28/14* (2006.01)
*B60R 21/00* (2006.01)

(52) U.S. Cl. ............... 280/735; 180/271; 180/282; 701/45

(58) Field of Classification Search ............. 280/735; 701/45; 180/271, 274, 282
See application file for complete search history.

(56) References Cited

U.S. PATENT DOCUMENTS

| | | | |
|---|---|---|---|
| 3,870,894 A | 3/1975 | Brede et al. | |
| 4,164,263 A * | 8/1979 | Heintz et al. | 280/735 |
| 4,346,914 A | 8/1982 | Livers et al. | 280/735 |
| 4,988,862 A | 1/1991 | Beltz | 250/227.15 |
| 5,185,701 A | 2/1993 | Blackburn et al. | 364/425 |
| 5,251,161 A | 10/1993 | Gioutsos et al. | 364/578 |
| 5,261,505 A | 11/1993 | Holroyd et al. | 480/274 |
| 5,441,301 A * | 8/1995 | Breed et al. | 280/735 |
| 5,544,716 A | 8/1996 | White | |
| 5,574,427 A * | 11/1996 | Cavallaro | 340/436 |
| 5,620,202 A * | 4/1997 | Gray et al. | 280/735 |
| 5,635,643 A | 6/1997 | Maji | 73/587 |
| 5,653,462 A * | 8/1997 | Breed et al. | 280/735 |
| 5,667,244 A | 9/1997 | Ito et al. | 280/735 |
| 5,684,701 A * | 11/1997 | Breed | 364/424.055 |
| 5,746,444 A * | 5/1998 | Foo et al. | 280/735 |
| 5,748,075 A | 5/1998 | Dirmeyer et al. | |
| 5,809,437 A | 9/1998 | Breed | 701/29 |
| 5,848,802 A * | 12/1998 | Breed et al. | 280/735 |
| 5,884,203 A * | 3/1999 | Ross | 701/45 |
| 5,890,085 A * | 3/1999 | Corrado et al. | 701/47 |
| 5,900,677 A * | 5/1999 | Musiol et al. | 307/10.1 |
| 5,904,368 A * | 5/1999 | Blackburn et al. | 280/735 |
| 5,906,393 A * | 5/1999 | Mazur et al. | 280/735 |
| 5,916,289 A * | 6/1999 | Fayyad et al. | 280/735 |

(Continued)

FOREIGN PATENT DOCUMENTS

EP   0445 907 A2   9/1991

(Continued)

*Primary Examiner*—Lesley D. Morris
*Assistant Examiner*—Marc A. Scharich
(74) *Attorney, Agent, or Firm*—Tarolli, Sundheim, Covell & Tummino LLP

(57) ABSTRACT

A system (10) for helping to protect a vehicle occupant includes a crash sensor (32) operative to sense a vehicle crash event and provide a crash signal having a characteristic indicative of the sensed crash event. An acoustic safing sensor (34) is operative to sense acoustic waves of the vehicle during a vehicle crash event and provide a safing signal having a characteristic indicative of the sensed acoustic waves. The system (10) also includes an occupant protection device (18, 20, 22, 24, 26, 28) for, when actuated, helping to protect the vehicle occupant during a vehicle crash event. A controller (30) controls actuation of the occupant protection device (18, 20, 22, 24, 26, 28) in response to the crash signal and the safing signal.

22 Claims, 4 Drawing Sheets

U.S. PATENT DOCUMENTS

| | | | | |
|---|---|---|---|---|
| 5,943,295 | A * | 8/1999 | Varga et al. | 367/99 |
| 5,964,815 | A * | 10/1999 | Wallace et al. | 701/45 |
| 6,007,095 | A * | 12/1999 | Stanley | 280/735 |
| 6,009,970 | A * | 1/2000 | Breed | 180/274 |
| 6,018,693 | A * | 1/2000 | Blackburn et al. | 701/45 |
| 6,020,812 | A * | 2/2000 | Thompson et al. | 340/438 |
| 6,026,340 | A * | 2/2000 | Corrado et al. | 701/47 |
| 6,036,225 | A * | 3/2000 | Foo et al. | 280/735 |
| 6,099,030 | A * | 8/2000 | Kraft | 280/735 |
| 6,198,999 | B1 * | 3/2001 | Ando | 701/45 |
| 6,209,909 | B1 * | 4/2001 | Breed | 280/735 |
| 6,226,578 | B1 * | 5/2001 | Willerton et al. | 280/735 |
| 6,595,544 | B1 * | 7/2003 | Hermann | 280/735 |

FOREIGN PATENT DOCUMENTS

| | | |
|---|---|---|
| WO | WO-99/17965 A1 | 4/1999 |

* cited by examiner

US 7,278,657 B1

METHOD AND APPARATUS FOR CONTROLLING AN ACTUATABLE OCCUPANT PROTECTION DEVICE USING AN ULTRASONIC SENSOR

TECHNICAL FIELD

The present invention relates to an apparatus and method for controlling an actuatable occupant protection device. More particularly, the present invention relates to a method and apparatus for controlling an actuatable occupant protection device using an ultrasonic sensor in combination with at least one other crash sensor.

BACKGROUND OF THE INVENTION

Actuatable occupant restraint systems, such as air bags and seat belt pretensioners, are well known in the art. Such restraint systems include one or more collision sensing devices, such as for sensing vehicle crash acceleration (e.g., vehicle deceleration). An air bag restraint system further includes an electrically actuatable igniter, referred to as a squib. When the collision sensing device senses a deployment crash event, an electrical current of sufficient magnitude and duration is passed through the squib to ignite the squib. When ignited, the squib initiates the flow of inflation fluid into an air bag from a source of inflation fluid, as is known in the art.

Occupant protection systems utilize a variety of crash sensing devices, which may be either mechanical or electrical in nature. For example, some occupant protection systems include one or more accelerometers that sense vehicle crash acceleration and provides a signal indicative thereof. Systems having an accelerometer further include additional circuitry (e.g., a controller) for monitoring the output of the accelerometer. The accelerometer is operatively connected to the controller, which may be a microcomputer, that discriminates between a deployment and a non-deployment crash event by applying a predetermined crash algorithm to the acceleration signal. When a deployment crash event is determined to be occurring, the controller actuates the restraint.

Air bag restraint systems also are known to require more than one sensor for detection of a deployment crash event. Often, the plural sensors are arranged in a voting scheme in which all the sensors must "agree" that a deployment crash event is occurring before restraint actuation is initiated. In certain known arrangements having plural sensors, the second sensor is referred to as a "safing sensor." Air bag actuation occurs only if the first sensor and the safing sensor both indicate that a deployment crash event is occurring. Typically, a safing sensor is a directional inertia responsive switch or accelerometer. Consequently, separate safing sensors are required for each crash sensor, which increases the cost of a restraint system proportional to the number of safing sensors being used.

SUMMARY OF THE INVENTION

One aspect of the present invention provides a system for helping protect a vehicle occupant. The system includes a crash sensor operative to sense a vehicle crash event and to provide a crash signal having a characteristic indicative of the sensed crash event. An acoustic safing sensor is operative to sense acoustic waves within the vehicle during a vehicle crash event and provide a safing signal having a characteristic indicative of the sensed acoustic waves. The system also includes an actuatable occupant protection device for, when actuated, helping protect the vehicle occupant during a vehicle crash event. A controller controls actuation the occupant protection device in response to both the crash signal and the safing signal indicating a vehicle crash event.

Another aspect of the present invention provides a system for helping to protect a vehicle occupant. The system includes a plurality of crash event sensors, each being operative to sense a different condition of the vehicle and to provide a corresponding sensor signal having a characteristic indicative of the vehicle condition sensed thereby. An acoustic safing sensor is operative to detect acoustic waves within the vehicle during a vehicle crash event and to provide a safing signal having a characteristic indicative of the sensed acoustic waves. The system also includes an occupant protection device which, when actuated, helps protect the vehicle occupant during a vehicle crash event. A controller is connected with each of the crash event sensors, the acoustic sensor, and the occupant protection device. The controller controls actuation of the occupant protection device in response to the sensor signal from any one of the crash event sensors and the safing signal from said acoustic sensor.

Still another aspect of the present invention provides a system for helping to protect a vehicle occupant. The system includes a sensor module mountable in a vehicle. The sensor module includes an accelerometer operative to sense vehicle acceleration and to provide an acceleration signal having a characteristic indicative of the sensed vehicle acceleration. The sensor module further includes an acoustic sensor operative to sense acoustic waves of the vehicle during a vehicle crash event and to provide a safing signal having a characteristic indicative of the sensed acoustic waves. The system includes an occupant protection device which, when actuated, helps protect the vehicle occupant during a vehicle crash event. A controller controls actuation of the occupant protection device in response to both the acceleration signal and the safing signal.

Yet another aspect of the present invention provides a method for controlling actuation of an actuatable occupant protection device of a vehicle. The method includes the steps of sensing a vehicle crash condition and providing an crash event signal having a characteristic indicative of the sensed vehicle crash condition. Acoustic waves traveling through the vehicle are sensed and a safing signal is provided based on the sensed acoustic waves. The occurrence of a vehicle crash event is determined in response to the crash event signal and the safing signal and actuation of an occupant protection device is controlled in response to such determination.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF AN EXEMPLARY EMBODIMENT

Figure 1:
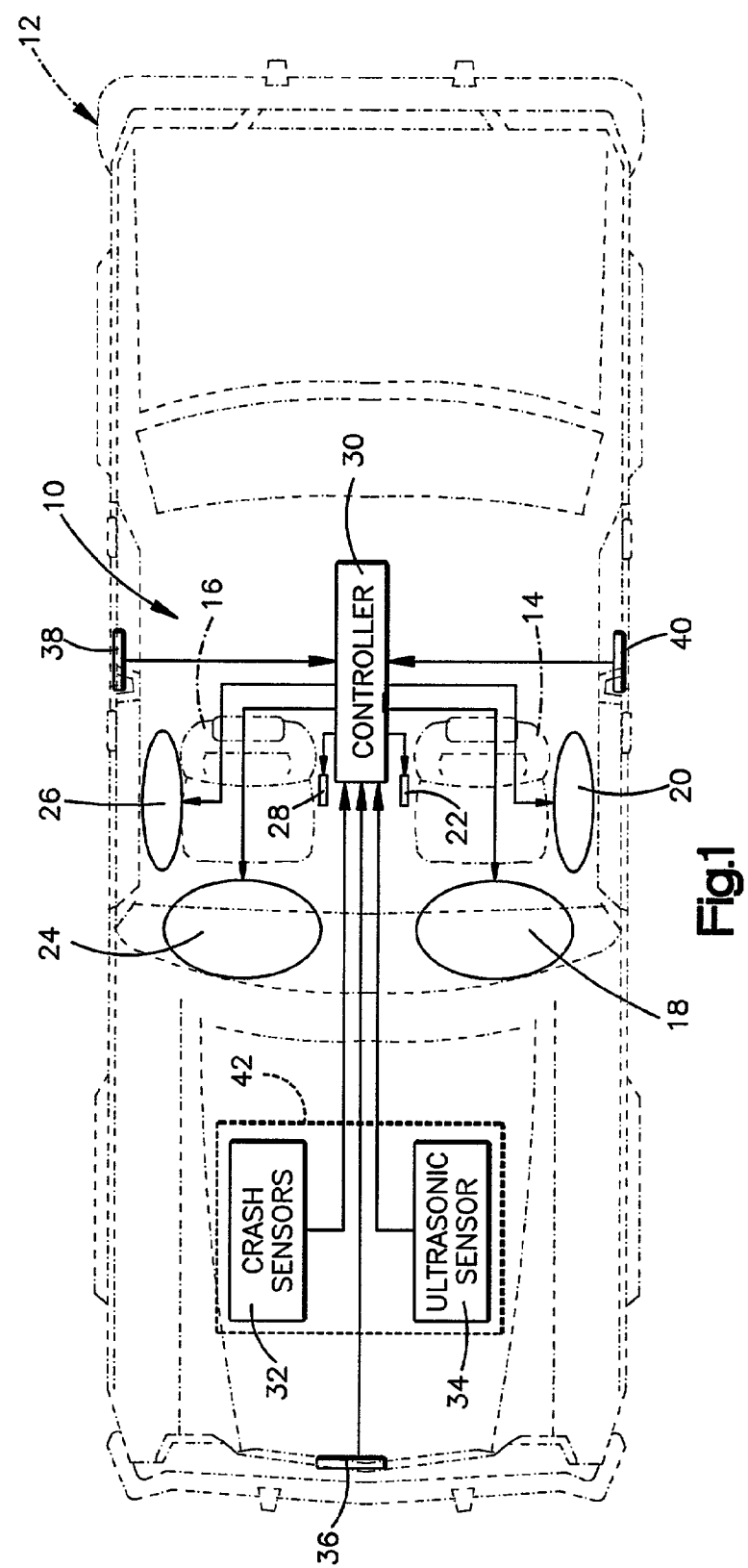
FIG. 1 is a schematic block diagram of a vehicle equipped with a system in accordance with the present invention.

FIG. 1 illustrates an actuatable occupant restraint system 10 for use in a vehicle 12. The vehicle 12 includes driver side and passenger side seats 14 and 16, respectively. The restraint system 10 includes at least one and preferably a plurality of actuatable restraint devices 18, 20, and 22 associated with the driver side seat 14. One or more actuatable restraint devices 24, 26, and 28 also are associated with the passenger seat 16.

By way of example, as shown in FIG. 1, a frontal inflatable restraint device 18, a side inflatable restraint device 20 as well as a seat belt pretensioner device 22 are associated with the drivers side seat 14. Similarly, a frontal inflatable restraint device 24, a side inflatable restraint device 26 and a seat belt pretensioner device 28 are associated with the passenger seat 16. Other types of actuatable occupant protection devices also may be associated with each seat 14, 16, such as an inflatable seat belt, an inflatable knee bolster, and an actuatable head restraint. The frontal air bags 18 and 24 also may be single stage or multi-stage inflatable restraint devices.

The restraint system 10 further includes a controller 30 electrically coupled to each of the actuatable occupant protection devices 18, 20, 22, 24, 26, 28 for controlling actuation of each of the actuatable occupant protection devices. The controller 30 preferably is a microcomputer programmed to control actuation of the occupant protection devices. The functionality of the controller 30 alternatively could be performed by one or more digital and/or analog circuits. The controller 30 also may be embodied in an application specific integrated circuit.

The controller 30 controls actuation of the occupant protection devices 18, 20, 22, 24, 26, and 28 upon determining the occurrence of a vehicle crash event. The controller 30 makes this determination in response to input signals received from a plurality of crash event sensors 32, 34, 36, 38, and 40 located in the vehicle 12.

Each of the crash sensors 32, 34, 36, 38, 40 monitors a particular vehicle condition and is responsive to the occurrence of a vehicle crash event. Each crash sensor 32, 34, 36, 38, 40 provides a crash signal having an electrical characteristic indicative of the vehicle condition sensed thereby. The system 10 preferably includes a crash sensor module 42 in which at least two different types of crash sensors are located, namely sensors 32 and 34. The crash sensor module 42 has a housing, which may be located at a central location in the vehicle 12 (FIG. 1).

For example, the crash sensor 32 is an accelerometer (or a plurality of accelerometers) that senses vehicle acceleration along one or more axes extending through the vehicle 12. The crash sensor 32 provides an acceleration signal to the controller 30 having an electrical characteristic that is indicative of the sensed vehicle acceleration, or deceleration, along its axis (or axes) of sensitivity.

The crash sensing device 34 is an acoustic transducer, such as an ultrasonic sensor, mounted to the vehicle 12. The crash sensing device senses high frequency acoustic waves that propagate through the vehicle structure during the occurrence of a vehicle crash event. For simplicity of explanation, and not by way of limitation, the "crash sensor 34" is hereinafter referred to as the "ultrasonic sensor 34."

The ultrasonic sensor 34 converts the sensed acoustic waves into a signal having an electrical characteristic indicative of the acoustic waves or vibrations transmitted through the vehicle during a vehicle crash event.

The ultrasonic sensor 34, for example, is a microphone, mounted within the housing of sensor module 42. The ultrasonic sensor 34 preferably is mounted to a printed circuit board (not shown) to which the crash sensor 32 also is mounted. In particular, the ultrasonic sensor 34 is connected with the vehicle frame, either directly or indirectly through intervening components, such as the printed circuit board and/or housing of the sensor module 42.

The sensors 36, 38, and 40 are crush zone sensors mounted respectively at the radiator location of the vehicle 12 and along the doors or B-pillars of the vehicle. The crush zone sensors 36, 38, and 40 enable the controller 30 to better discriminate between certain types of vehicle crash event conditions. Each of the crush zone sensors 36, 38, 40, for example, provides a signal to the controller 30 having an electrical characteristic functionally related to the crash acceleration experienced by the portion of the vehicle to which the sensor is mounted. Alternatively, the sensors 36, 38, and 40 may provide a signal indicating that an associated part of the vehicle has been deformed by at least a predetermined amount. In this way, the controller 30 can better determine the location of impact and/or the severity thereof.

Figure 2:
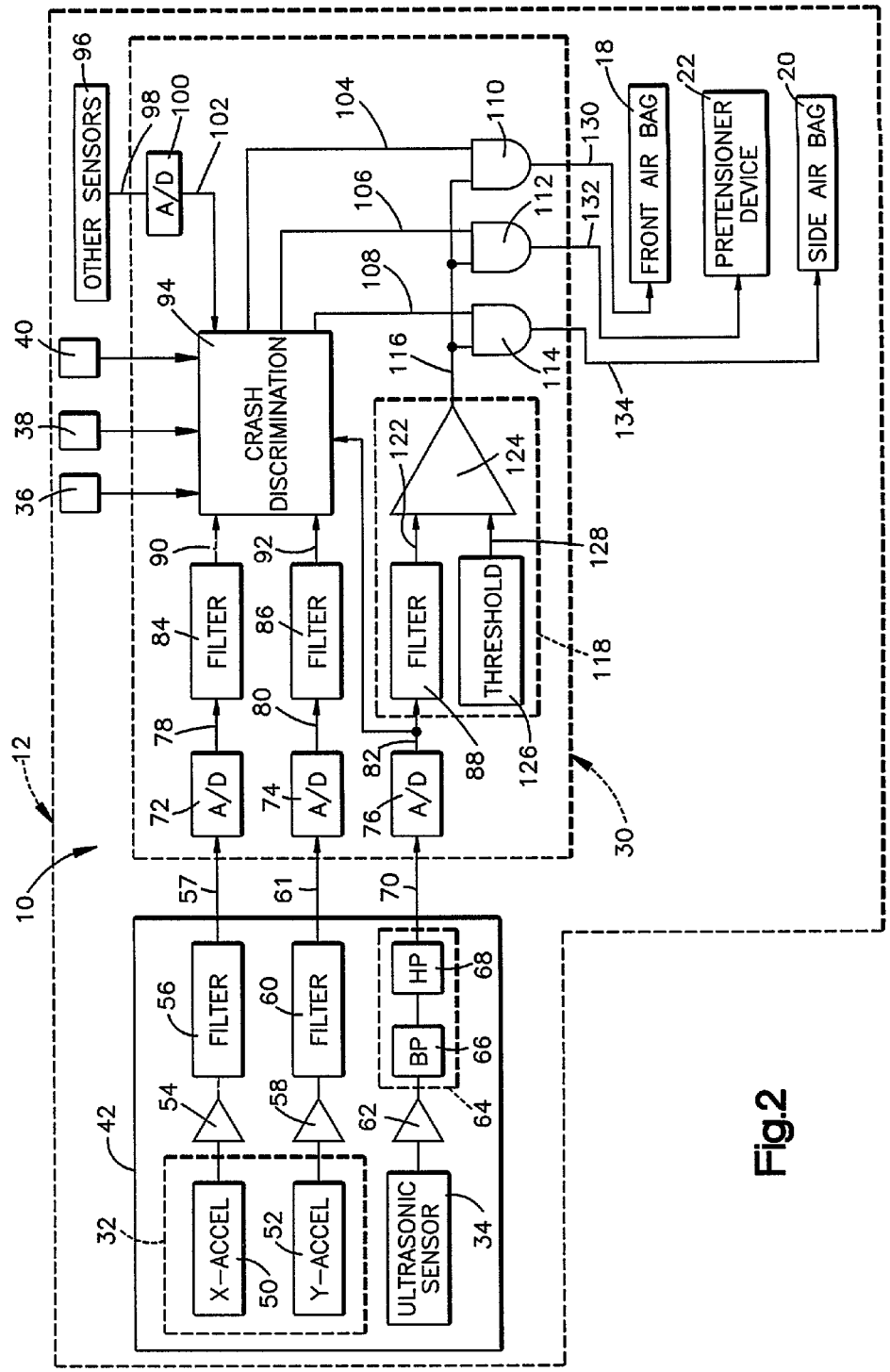
FIG. 2 is a functional diagram illustrating the operation of the system shown in FIG. 1 in accordance with the present invention.

The operation of the system 10 of FIG. 1 will be better appreciated with respect to FIG. 2, in which identical reference numbers refer to corresponding parts of the system 10 previously identified with respect to FIG. 1. The blocks located with the controller 30 indicate functions performed by the controller. Additionally, while, for purposes of simplicity of explanation, FIG. 2 shows the controller 30 connected to control actuation of three occupant protection devices 18, 20, and 22 associated with the driver seat 14 (FIG. 1), the controller functions are equally applicable to the occupant protection devices 24, 26, and 28 associated with the passenger seat 16 (FIG. 1) or other locations in the vehicle. Such controller functions are also applicable to control actuation of other types of restraint devices that may be used in the system 10.

The crash sensor module 42 houses the ultrasonic sensor 34 and the crash sensor 32. The crash sensor 32 includes an X-accelerometer 50 and a Y-accelerometer 52. The X-accelerometer 50 and the Y-accelerometer 52 are oriented so as to have substantially transverse axes of sensitivity. The X-accelerometer 50, for example, is operative to sense vehicle acceleration along an X-axis oriented parallel to the direction of travel of the vehicle. The Y-accelerometer 52 has an axis of sensitivity oriented transverse to the direction of travel of the vehicle, e.g., a Y-axis. The Y-accelerometer 52, for example, may sense vehicle acceleration along a lateral (e.g., side to side) or vertical direction of the vehicle.

Each of the accelerometers 50, 52 provides a respective acceleration signal having an electrical characteristic indicative of the vehicle acceleration sensed thereby. The acceleration signals can take any of several forms known in the art. The crash acceleration signals, for example, can have amplitude, frequency, pulse duration, and/or other characteristics that vary as a function of the sensed acceleration.

The X-accelerometer 50 provides its acceleration signal to an analog amplifier 54 which amplifies the acceleration signal to a useable level. The amplifier 54, in turn, provides an amplified acceleration signal to an analog filter network 56, which also may be connected to the same PC board and be located in the sensor module 42. The filter network 56 removes undesired frequency components and noise that are not helpful in determining the occurrence of a vehicle crash event. The filter network 56 provides an amplified, filtered signal to an input of the controller 30 via connection 57.

The acceleration signal from the Y-accelerometer 52 also is amplified and filtered through a corresponding amplifier 58 and filter network 60. The filter network 60 provides an amplified, filtered signal to another input of the controller 30 via connection 61.

The signal from the ultrasonic sensor 34 is amplified to a useable level by an appropriate analog amplifier 62. The amplified signal is provided to an envelope detector 64 formed of an analog filter network. The envelope detector, for example, includes a bandpass filter ("BP") 66 and a high-pass ("HP") filter 68 to respectively provide envelope detection and help remove drift. Other circuitry could be used for providing the desired envelope detection of the ultrasonic waves that propagate through the vehicle structure. The amplifier 62 and the filter network 64 are schematically illustrated as being connected to a common circuit board located within the housing of the sensor module 42. The filter network alternatively could be located external to the module.

The ultrasonic sensor 34 and analog filter network 64 are designed or tuned to be responsive to ultrasonic acoustic waves traveling through the vehicle within a selected frequency range. In particular, the ultrasonic sensor 34 is responsive to acoustic waves traveling through the vehicle structure at about 200 to about 300 kHz, which is the resonant frequency of a vehicle body during a vehicle crash event. The frequency range could be broader or narrower, as desired. The high-pass filter 68 provides a filtered signal to a corresponding input of the controller 30 via connection 70.

The analog crash sensor signals provided at lines 57, 61 and 70 from the respective crash sensors 50, 52, and 34 are converted to corresponding digital signals through respective analog-to-digital (A/D) converters 72, 74, and 76. The A/D converters 72, 74, and 76 may be part of the controller 30, as shown, or may be part of other circuitry located external to the controller. Each A/D converter 72, 74, 76 provides a digitized representation of the respective input signals, as is known in the art. The digitized crash sensor signals, indicated at 78, 80, and 82, are, in turn, filtered through appropriate digital filter functions 84, 86, and 88, respectively, performed by the controller 30.

The digital filter functions 84 and 86, for example, may include high pass and/or low pass digital filtering for removing unwanted frequency components. The filter functions 84 and 86 also may integrate the crash sensor signals. The filter functions 84 and 86 provide digitized filtered signals 90 and 92, respectively, to a crash discrimination function 94.

The crash discrimination function 94, for example, is a software module stored in the controller 30 that discriminates between deployment and non-deployment crash events. The crash discrimination function 94 also may determine the severity of the detected crash event based on the crash sensor signals from each of the accelerometers 50 and 52, the signals from the crush zone sensors 36, 38, and 40, and signals provided from other sensors 96. For example, crash severity may be determined to help control actuation of a multi-stage actuatable occupant protection device, such as one or more of the inflatable restraint devices 18, 20, 24, and 26 (FIG. 1).

Referring back to FIG. 2, the crash discrimination function 94 further may determine crash severity based on a digitized ultrasonic sensor signal 82 from the A/D converter 76. In particular, crash severity may be determined as a function of the amplitude of the digitized ultrasonic sensor signal 82 over time or, alternatively, as a function of the energy of the digitized ultrasonic signal. Using the ultrasonic sensor signal 82 advantageously permits a rapid determination of crash severity, as it does not rely on moving parts to be actuated.

The other sensors 96, which may form part of the restraint system 10 in accordance with the present invention, may detect a condition of a vehicle occupant located in the vehicle seats 14 and 16 (FIG. 1). The occupant conditions may include occupant weight, occupant position within the vehicle, whether the occupant is belted, etc. Each of such other sensors 96 provides a sensor signal 98 to an A/D converter 100 of the controller 30. The A/D converter 100, in turn, provides a digitized indication of the sensed condition, indicated at 102, to the crash discrimination function 94. Appropriate filtering also may be provided, but has been omitted for simplicity of explanation. The signal 102 further may be used by the crash discrimination function 94 to help control actuation of the actuatable occupant protection devices 18, 20, 22, 24, 26, and 28 (FIG. 1).

An example of one type of crash severity algorithm that can be used in the crash discrimination function 94 is of the type disclosed in U.S. patent application Ser. No. 09/197,143 to Foo et al., filed Nov. 20, 1998, entitled "Method and Apparatus for Controlling an Actuatable Restraint Device Using Crash Severity Indexing and Crush Zone Sensor." Briefly stated, the crash discrimination is performed by a crash severity algorithm. The crash severity algorithm provides a signal having several features for controlling actuation of the associated occupant protection devices 18, 20, and 22. One feature, for example, indicates that a deployment crash condition is occurring and is used to actuate the first stage of a multi-stage actuatable occupant protection device, such as the frontal air bag 18. Other features of the crash severity signal are used, for example, to control actuation of other stages of the multi-stage restraint device 18 as well as control actuation of other occupant protection devices of the system, such as devices 20 and 22. Other types of crash algorithms and methods of crash discrimination also may be used with the present invention.

Referring back to FIG. 2, the crash discrimination function 94 provides signals 104, 106, and 108 for controlling actuation of the respective occupant protection devices 18, 20, and 22. Specifically, each of the crash discrimination signals 104, 106, 108 is provided to a corresponding input of an associated AND gate 110, 112, 114. Each of the AND gates has at least another input that receives a safing signal 116 from a common safing function 118.

The safing function 118 provides the safing signal 116 as a function of the digitized ultrasonic sensor signal 82. The safing function 118 includes the digital filter function 88. The digital filter function 88 provides a filtered, digitized signal 122 to an input of a comparator function 124. The safing function 118 also includes a threshold circuit 126 that provides a predetermined reference signal 128 to another input of the comparator function 124.

The comparator function 124 compares the filtered, digitized sampling of the ultrasonic signal 122 against the reference signal 128 to provide the safing signal 116 indicative of the occurrence or non-occurrence of a vehicle crash event. In particular, the comparator provides the safing signal 116 at a first logic level (e.g., HIGH) when the signal 122 has a value that is greater than the reference signal 128. On the other hand, if the signal 122 has a value that is less than or equal to the reference signal 128, the safing signal 116 is provided at another logic level (e.g., LOW).

The filter function 88 performs signal processing on the signal 88 to provide the signal 122 having characteristics commensurate with the reference signal 128 being provided by the threshold circuit 126. The filter function 88, for example, may be a digital filter having a transfer function with a low time constant so as to provide a time-averaged representation of the ultrasonic sensor signal. Alternatively or additionally, the filter function 88 may integrate the sampled sensor signal 82 with respect to time to provide a signal having a characteristic indicative of the measured energy of the sensed acoustic waves over time. For example, the signal 122 is in the form of a window that includes a plurality of digitized samples indicative of the sensed acoustic waves traveling through the vehicle over time. The filtered signal 122 also may be provided to the crash discrimination function 94 to help discriminate between different types of crash events.

Similarly, the threshold circuit 126 is configured to provide the reference signal 128 according to the particular signal parameters contained in the filtered signal 122. The reference signal 128, for example, may be a reference voltage level of a predetermined amplitude to provide a fixed threshold. The particular amplitude of the reference signal preferably is normalized to a level suitable for comparison with the reference signal 128. The normalization will vary depending on the part of the vehicle to which the ultrasonic sensor 34 is mounted and the particular medium (e.g., the sensor module housing and other vehicle structure) through which the ultrasonic signals must propagate to reach the ultrasonic sensor. Furthermore, rather than a fixed threshold reference signal 128, the threshold circuit 126 may be configured to provide a variable reference signal that varies with respect to time, such as based on empirical data obtained for a particular vehicle platform.

The comparator function 124 compares the threshold signal 128 and the filtered ultrasonic signal 122 to provide the safing signal 116 (e.g., logic LOW or HIGH). The safing signal 116 is logically ANDed with each of the crash discrimination signals 104, 106, 108 from the crash discrimination function 94. Provided that the safing signal 116 indicates that a vehicle crash event is occurring (e.g., logic HIGH), appropriate crash signals 130, 132, and 134 are provided to the respective occupant protection devices, such as the front air bag 18, the seat belt pretensioner device 22, and the side air bag 20. In accordance with the present invention, the safing signal 116 also is used to provide safing for the other occupant protection devices 24, 26, and 28 associated with the passenger seat 16 (FIG. 1).

While the safing function 118 has been described as processing the ultrasonic sensor signal based on the amplitude thereof, other aspects of the ultrasonic sensor signal may be used and processed to provide the safing signal 116. For example, the frequency, energy, and/or an integration of the ultrasonic sensor signal may be algorithmically processed to provide an indication of the occurrence and/or of the severity of a vehicle crash event. The crash discrimination function 94 also might use the digitized ultrasonic signal 82 to help discriminate the occurrence of a vehicle crash event and/or determined the severity thereof.

Figure 3:
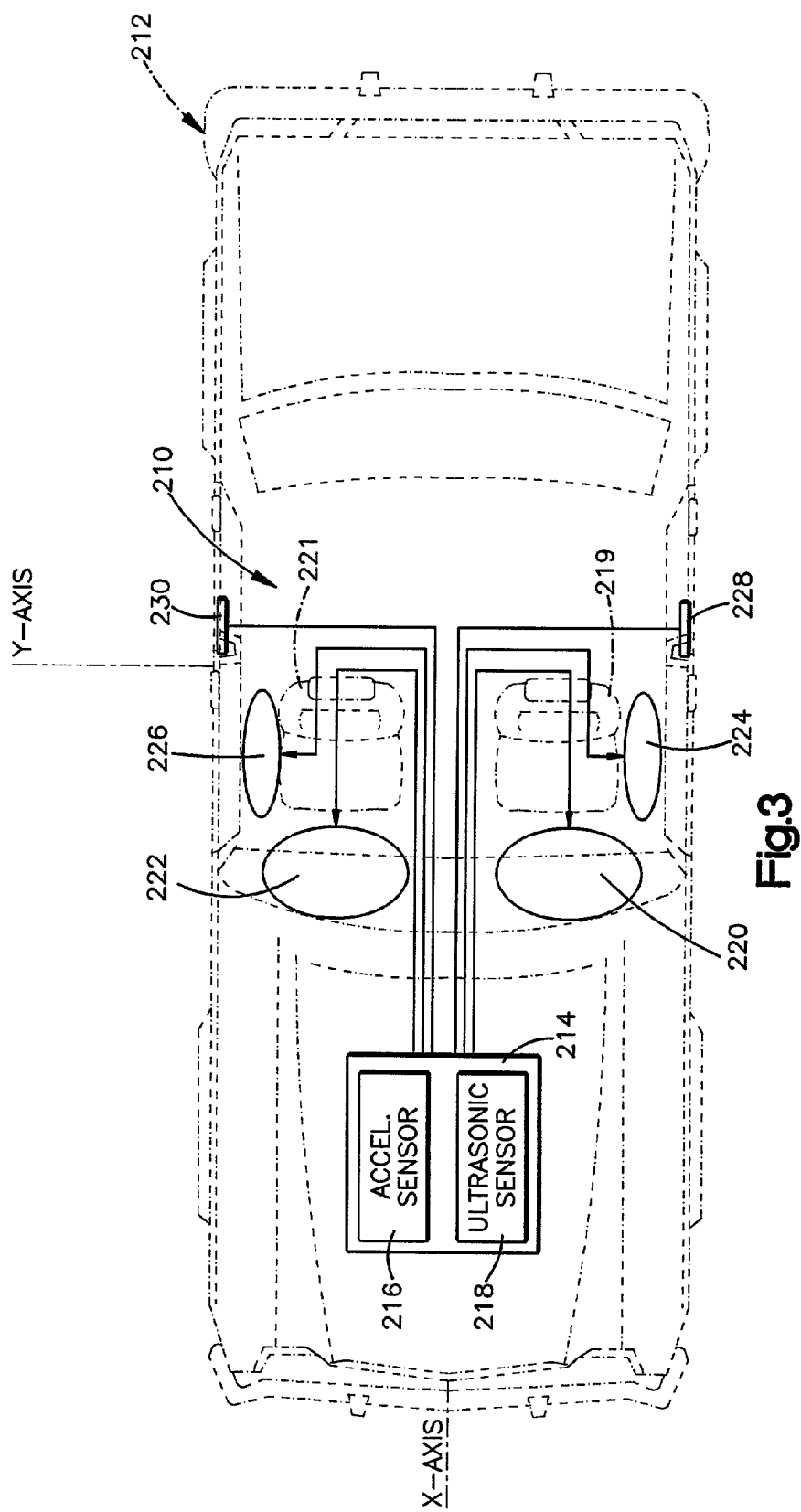
FIG. 3 is a schematic block diagram of a vehicle equipped with a system in accordance with another exemplary embodiment of the present invention.

FIG. 3 illustrates an alternative exemplary embodiment of an actuatable occupant protection system 210 mounted in a vehicle 212. The system 210 includes a central crash sensing module 214 mounted in a substantially central vehicle location. The central module 214 includes a controller, such as a microcomputer, for determining the occurrence of a deployment vehicle crash event and controlling actuation of appropriate occupant protection equipment. In order to detect the occurrence of a vehicle crash event, the crash sensing module 214 includes an acceleration sensor 216 for sensing vehicle crash acceleration. By way of example, the acceleration sensor 216 is an accelerometer that senses vehicle acceleration along an X-axis of the vehicle 212 extending between the front and rear ends of the vehicle. The central module 214 also includes an ultrasonic sensor 218. The ultrasonic sensor 218 is an omni-directional ultrasonic sensing device substantially identical to that described above with respect to FIGS. 1 and 2.

The system 210 includes actuatable vehicle occupant protection equipment for helping protect vehicle occupants during determined deployment crash events. For example, the system 210 includes front air bags 220 and 222 and side air bags 224 and 226. Seat belt pretensioner devices (not shown for purposes of brevity) also could be part of the system 210 associated with respective vehicle seats 219 and 221.

The system 210 includes side impact crash sensors 228 and 230 located at side locations of the vehicle remote from the central module 214. The side impact crash sensors 228 and 230 are connected to the central module 214. For example, side impact crash sensors 228 and 230 are acceleration sensors (e.g., accelerometers) for sensing acceleration of the side part of the vehicle to which each sensor is mounted. Each such accelerometer detects acceleration of a side part of the vehicle along a Y-axis, which extends laterally through the vehicle perpendicular to the X-axis.

In this exemplary embodiment, no Y-axis accelerometer is required within the central module 214 for safing side impact vehicle crash events. Instead, the ultrasonic sensor 218 provides omni-directional safing for both frontal vehicle crash events (e.g., sensed by acceleration sensor 216) and side impact crash events (e.g., sensed by side impact sensors 228, 230). Accordingly, the controller of the central module 214 controls actuation of the associated occupant protection equipment in response to the acoustic waves detected by the ultrasonic sensor 218 and the vehicle acceleration detected by the acceleration sensor 216 and/or the remote crush zone sensors 228, 230.

The omni-directional ultrasonic sensor 218 helps improve the time-to-fire during the frontal impact crash events without the need for a front crush zone sensor (e.g., 36 of FIG. 1). The responsiveness and, thus, time-to-fire characteristics for side impact crash events also are improved through the use of the ultrasonic safing sensor 218 in combination with the side impact sensors 228 and 230.

Figure 4:
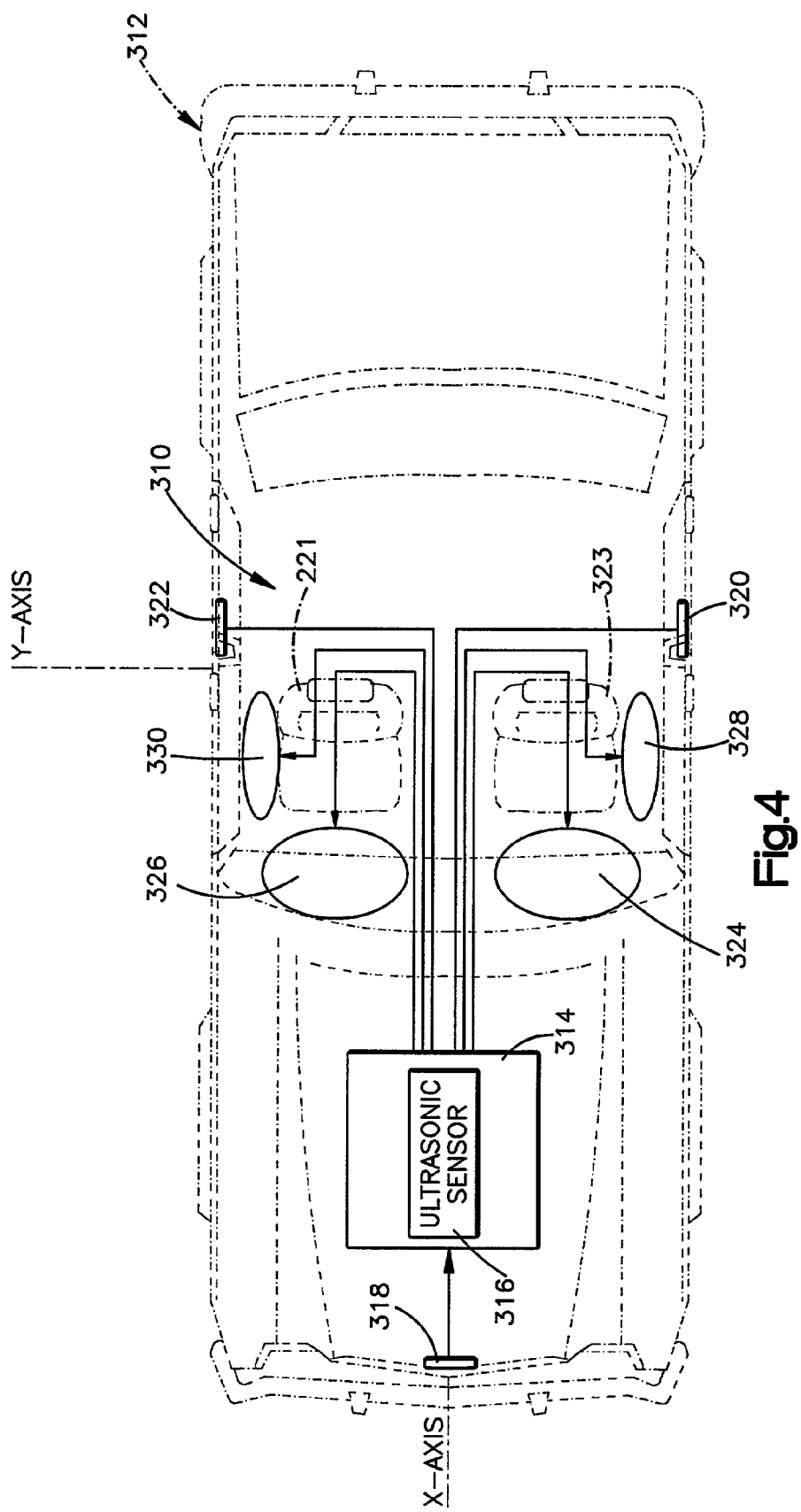
FIG. 4 is a schematic block diagram of a vehicle equipped with a system in accordance with yet another exemplary embodiment of the present invention.

FIG. 4 illustrates yet another exemplary embodiment of an actuatable occupant protection system 310 mounted in a vehicle 312. This system 310 includes a central module 314 mounted at a central location within the vehicle 312. In this exemplary embodiment, the central module 314 includes a controller, such as a microcomputer programmed for determining the occurrence of a vehicle crash event and for controlling actuation of associated occupant protection equipment.

The central module 314 includes an ultrasonic sensor 316, such as described with respect to the embodiment of FIGS. 1 and 2. The system 310 includes a front vehicle crash event sensor 318 connected with the central module 314. The front crash event sensor 318 is located in forward part of the vehicle 312 remote from the central module 314. The system 310 also includes side impact crash event sensors 320 and 322 connected with the central module 314. The side impact crash sensors are located at the respective sides of the vehicle 312 remote from the central module 314.

By way of example, the front crash sensor 318 preferably is a crush zone sensor, such as an accelerometer having an axis of sensitivity along an X-axis that extends between the front and rear ends of the vehicle 312. The side impact crash sensors 320 and 322 also are crush zone sensors, but have axes of sensitivity oriented along a Y-axis of the vehicle 312, which extends laterally through the vehicle substantially perpendicular to the X-axis. Each of the crash sensors 318, 320, 322 provides a signal to the central module 314 having an electrical characteristic indicative of the acceleration sensed thereby.

The ultrasonic sensor 316, as mentioned above, operates as an omni-directional crash event sensor. That is, the ultrasonic sensor 316 detects acoustic waves or vibrations transmitted through the vehicle during a vehicle crash event originating from any direction.

The central module 314 controls actuatable occupant protection devices associated with vehicle seats 323, 325. The system 310 includes, for example, front air bags 324 and 326 and side air bags 328 and 330. Seat belt pretensioners as well as other occupant protection equipment also may, in accordance with the present invention, be used in the system 310 and be controlled by the central module 314.

The central module 314 is programmed to discriminate between deployment and non-deployment front impact crash events and deployment and non-deployment side impact crash events. The central module 314 controls actuation of the associated occupant protection equipment (e.g., 324, 326, 328, 330) in response to the acoustic waves detected by the ultrasonic sensor 316 and vehicle acceleration detected by the remote crash sensors 318, 320, 322. The ultrasonic sensor 316 provides omni-directional safing for each of the crash event sensors 318, 320, 322. The ultrasonic sensor 316 also provides an additional mechanism for helping to discriminate between deployment and non-deployment vehicle crash events. This, in turn, helps to improve system responsiveness and time-to-fire characteristics for deployment crash events.

In view of the foregoing, the system (e.g., 10, 210, 310), in accordance with present invention, provides a method and apparatus for controlling actuation of one or more occupant protection devices with a common ultrasonic sensor (e.g., 34, 218, 316) that verifies the occurrence of a vehicle crash event. Advantageously, the ultrasonic sensor has a virtually instantaneous response time, substantially only limited by the speed of sound and the attenuation of the signal in the vehicle body.

In addition, the ultrasonic sensor (e.g., 34, 218, 316) is able to sense acoustic waves or vibrations traveling through the vehicle due to the occurrence of a vehicle crash event, regardless of the direction of impact and the cause of the impact, except perhaps an impending vehicle rollover condition. Therefore, a single ultrasonic sensor, in accordance with the present invention, provides an omni-directional safing sensor for use in combination with a plurality of occupant protection devices that may be actuated in response to sensing different vehicle conditions indicative of a vehicle crash event. Accordingly, the use of an omni-directional ultrasonic sensor further reduces manufacturing costs typically associated with having more than one safing sensor.

Furthermore, using the ultrasonic sensor as a crash severity indicator may permit an earlier time-to-fire determination than typically available with a conventional mechanical safing mechanism. This is particularly desirable in an occupant protection system having multi-stage occupant protection devices.

From the above description of the invention, those skilled in the art will perceive improvements, changes and modifications. Such improvements, changes and modifications within the skill of the art are intended to be covered by the appended claims.

The invention claimed is:

1. A system for helping to protect a vehicle occupant, said system comprising:
    a crash sensor operative to sense a vehicle crash event and provide a crash signal having a characteristic indicative of the sensed vehicle crash event;
    an acoustic safing sensor operative to sense acoustic waves propagating through a structure of a vehicle during the vehicle crash event and provide a safing signal having a characteristic indicative of the vehicle crash event;
    an actuatable occupant protection device for, when actuated, helping to protect the vehicle occupant during the vehicle crash event; and
    a controller which controls actuation of said occupant protection device in response to both said crash signal and said safing signal separately indicating an occurrence of a deployment crash event.

2. The system as set forth in claim 1 wherein said crash sensor is an accelerometer.

3. The system as set forth in claim 2 further including a sensor module mountable within the vehicle, said sensor module including said acoustic safing sensor and said accelerometer.

4. The system as set forth in claim 2 wherein said acoustic safing sensor is an omni-directional ultrasonic sensor for sensing ultrasonic acoustic waves propagating through the vehicle structure during vehicle crash events originating in any of a plurality of directions and providing said safing signal indicative thereof.

5. The system as set forth in claim 4 further including a sensor module mountable within the vehicle, said ultrasonic sensor being part of said sensor module, said accelerometer being a crush zone sensor remote from said sensor module for sensing acceleration of part of the vehicle indicative of the vehicle crash event and providing said crash signal having an electrical characteristic indicative thereof.

6. The system as set forth in claim 5 wherein said crush zone sensor is a front crush zone sensor located at a forward part of the vehicle and electrically connected with said controller, said front crush zone sensor sensing a front impact vehicle crash event in response to movement of the forward part of the vehicle and providing a front crash signal indicative thereof, said controller controlling actuation of said occupant protection device in response to both said safing signal and said front crash signal indicating the occurrence of the deployment crash event.

7. The system as set forth in claim 5 wherein said crush zone sensor is a side crush zone sensor located at a side part of the vehicle and electrically connected with said controller, said side crush zone sensor sensing a side impact vehicle crash event in response to movement of the side part of the vehicle and providing a side crash signal indicative thereof, said controller controlling actuation of said occupant protection device in response to both said safing signal and said side crash signal indicating the occurrence of the deployment crash event.

8. The system as set forth in claim 1 wherein said crash sensor further includes a plurality of accelerometers, each of said plurality of accelerometers being operative to sense vehicle acceleration and provide a respective acceleration signal, said controller controlling actuation of said occupant protection device in response to an acceleration signal from at least one of said plurality of accelerometers and said safing signal.

9. The system as set forth in claim 8 further including a sensor module mountable within the vehicle, said acoustic safing sensor and at least one of said plurality of accelerometers being part of said sensor module.

10. A system for helping to protect a vehicle occupant, said system comprising:
   a plurality of crash event sensors, each of said plurality of crash event sensors being operative to sense a different vehicle condition of a vehicle and to provide a corresponding sensor signal having a characteristic indicative of the vehicle condition sensed thereby;
   an acoustic safing sensor operative to sense acoustic waves propagating through a vehicle structure during a vehicle crash event and to provide a safing signal having a characteristic indicative of the vehicle crash event;
   an occupant protection device for, when actuated, helping to protect the vehicle occupant during the vehicle crash event; and
   a controller connected with each of said plurality of crash event sensors, said acoustic safing sensor, and said occupant protection device, said controller determining an occurrence of the vehicle crash event and controlling actuation of said occupant protection device in response to the sensor signal from any one of said plurality of crash event sensors and the safing signal from said acoustic safing sensor separately indicating an occurrence of a deployment crash event.

11. The system as set forth in claim 10 wherein each of said plurality of crash event sensors is selected from a group consisting of an accelerometer and a crush zone sensor.

12. The system as set forth in claim 10 further including a sensor module mountable within the vehicle, said acoustic safing sensor being part of said sensor module.

13. The system as set forth in claim 12 wherein at least one of said plurality of crash event sensors is part of said sensor module.

14. A system for helping to protect a vehicle occupant, said system comprising:
   a sensor module for mounting in a vehicle, said sensor module including:
      an accelerometer operative to sense vehicle acceleration and provide an acceleration signal having a characteristic indicative of the sensed vehicle acceleration; and
      an acoustic sensor operative to detect acoustic waves propagating through a vehicle structure during a vehicle crash event and to provide a safing signal having a characteristic indicative of the vehicle crash event; said system further comprising:
   an occupant protection device for, when actuated, helping to protect the vehicle occupant during the vehicle crash event; and
   a controller which controls actuation of said occupant protection device in response to both said acceleration signal and said safing signal separately indicating an occurrence of a deployment crash event.

15. The system as set forth in claim 14 wherein said sensor module further includes a plurality of accelerometers, each of said plurality of accelerometers being operative to sense vehicle acceleration and provide a respective acceleration signal indicative of the vehicle acceleration sensed thereby, said controller controlling actuation of said occupant protection device in response to the acceleration signal from at least one of said plurality of accelerometers and said safing signal from said acoustic sensor, whereby the acoustic sensor provides a safing signal for each of the plurality of accelerometers.

16. The system as set forth in claim 14 further including a side crush zone sensor located at a side part of the vehicle and electrically connected with said controller, said side crush zone sensor sensing a side impact vehicle crash event in response to acceleration of the side part of the vehicle and providing a side crash signal indicative thereof, said controller controlling actuation of said occupant protection device in response to both said safing signal and said side crash signal indicating the occurrence of the deployment crash event.

17. A method for controlling actuation of an actuatable occupant protection device of a vehicle, said method comprising the steps of:
   sensing a vehicle crash condition;
   providing a crash event signal having a characteristic indicative of the sensed vehicle crash condition;
   sensing acoustic waves that travel through a vehicle structure during an occurrence of the vehicle crash condition;
   providing a safing signal in response to the sensed acoustic waves during the vehicle crash condition;
   determining an occurrence of a vehicle crash event in response to both the crash event signal and the safing signal separately indicating the occurrence of the vehicle crash condition; and
   controlling actuation of an occupant protection device in response to said determination.

18. The method as set forth in claim 17 further including providing a plurality of crash event sensors, each of the crash event sensors sensing the vehicle crash condition and providing the crash event signal indicative of the vehicle crash condition sensed thereby, said step of determining the vehicle crash event further including determining an occurrence of the vehicle crash event in response to the crash event signal from at least one of the plurality of crash event sensors and the safing signal from the sensed acoustic waves.

19. The method as set forth in claim 18 wherein each crash event sensor is an accelerometer that provides an acceleration signal indicative of vehicle acceleration.

20. The method as set forth in claim 17 further including mounting a front crush zone sensor at a forward part of the vehicle, said step of sensing the vehicle crash condition including sensing a front impact vehicle crash event with the front crush zone sensor, the crash event signal being a front crash signal indicative of the sensed front impact vehicle crash event sensed by the front crush zone sensor, actuation of the occupant protection device being controlled in response to both the safing signal and the front crash signal indicating an occurrence of a deployment crash event.

21. The method as set forth in claim 17 further including mounting a side crush zone sensor at a side part of the vehicle, said step of sensing the vehicle crash condition including sensing a side impact vehicle crash event with the side crush zone sensor, the crash event signal being a side crash signal indicative of the sensed side impact vehicle crash event sensed by the side crush zone sensor, actuation of the occupant protection device being controlled in response to both the safing signal and the side crash signal indicating an occurrence of a deployment crash event.

22. A system for helping to protect a vehicle occupant, said system comprising:

means for sensing a vehicle crash condition and providing a crash event signal having a characteristic indicative thereof;

means for sensing acoustic waves that travel through a vehicle structure in response to an occurrence of the vehicle crash condition and providing a safing signal having a characteristic indicative of a vehicle crash event; and control means for determining an occurrence of the vehicle crash event in response to both the crash event signal and the safing signal separately indicating an occurrence of a deployment crash event and controlling actuation of an occupant protection device in response to the determination.

* * * * *